(12) United States Patent
Kamiya et al.

(10) Patent No.: US 8,773,040 B2
(45) Date of Patent: Jul. 8, 2014

(54) INDICATOR DRIVE CIRCUIT

(75) Inventors: Yusuke Kamiya, Aichi (JP); Satoki Uruno, Aichi (JP); Junichi Matsubara, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 329 days.

(21) Appl. No.: 13/334,597

(22) Filed: Dec. 22, 2011

(65) Prior Publication Data

US 2012/0176040 A1    Jul. 12, 2012

(30) Foreign Application Priority Data

Jan. 12, 2011  (JP) .................................. 2011-003829

(51) Int. Cl.
*H05B 37/02* (2006.01)
*H05B 33/08* (2006.01)

(52) U.S. Cl.
CPC ........... *H05B 33/0812* (2013.01); *Y02B 20/345* (2013.01)
USPC ...................................... 315/291; 315/209 R

(58) Field of Classification Search
CPC ........... H05B 33/0812; H05B 33/0815; H05B 33/0836; H05B 33/0845; H05B 37/02; Y01B 210/345; Y01B 20/347
USPC ...... 315/209 R, 224–226, 291, 307, 308, 312
See application file for complete search history.

(56) References Cited

U.S. PATENT DOCUMENTS

| 6,516,015 | B1 | 2/2003 | Kimura |
| 8,358,084 | B2* | 1/2013 | Shiu et al. ...................... 315/291 |
| 2003/0227319 | A1 | 12/2003 | Miyashita et al. |
| 2012/0068619 | A1* | 3/2012 | Sung et al. ...................... 315/291 |

FOREIGN PATENT DOCUMENTS

| CN | 1467914 | 1/2004 |
| JP | 06-326579 A | 11/1994 |
| JP | 2000-216486 A | 8/2000 |

OTHER PUBLICATIONS

Japanese Office Action from corresponding Japanese Application 2011-003829 dated Sep. 17, 2013 and partial English translation.
CN office action and partial English translation dated Nov. 25, 2013.

* cited by examiner

*Primary Examiner* — Jimmy Vu
(74) *Attorney, Agent, or Firm* — Roberts Mlotkowski Safran & Cole P.C.

(57) ABSTRACT

An indicator drive circuit includes a current mirror circuit including a first transistor located at a control side and a second transistor located at a controlled side, a current through the current mirror circuit being switched by an external control signal, a current source adapted to feed a control current to the first transistor of the current mirror circuit, and a switching element adapted to be driven by a current through the second transistor of the current mirror circuit and to switch on or off an indicator light source. The current source includes two transistors cascode-connected.

6 Claims, 2 Drawing Sheets

INDICATOR DRIVE CIRCUIT

The present application is based on Japanese patent application No. 2011-003829 filed on Jan. 12, 2011, the entire contents of which are incorporated herein by reference.

BACKGROUND OF THE INVENTION

1. Field of the Invention

This invention relates to an indicator drive circuit for turning on or off an indicator with a light source such as an LED.

2. Description of the Related Art

For example, in order to switching an indicator driven by a battery power supply of 12V by using a control signal of 5V system, a vehicle needs an indicator drive circuit for shifting the level of the control signal so as to control a switching element. A conventional indicator drive circuit uses, e.g., a MOS transistor with a high output as the switching element for turning on or off electrical current from the battery power supply, and a control part of 5V system controls the electrical current to be fed into a resistance between a gate and a source of the MOS transistor, so an LED connected to the MOS transistor is turned on/off (for example, see JP-A-06-326579).

SUMMARY OF THE INVENTION

However, in the conventional indicator drive circuit, when the drive current of the switching element such as a power MOS transistor being operated by the battery power supply is fed through a current mirror circuit of the control part being operated by the 5V system, electrical current flowing through the current mirror circuit may vary in conjunction with the variation of the power supply voltage of the control part. Thus, the LED as a light source of the indicator may cause a fluctuation or flicker in brightness.

Therefore, it is an object of the invention to provide an indicator drive circuit that prevents a light source of an indicator from flickering by variation of power supply voltage.

(1) According to one embodiment of the invention, an indicator drive circuit comprises:

a current mirror circuit comprising a first transistor located at a control side and a second transistor located at a controlled side, a current through the current mirror circuit being switched by an external control signal;

a current source adapted to feed a control current to the first transistor of the current mirror circuit; and a switching element adapted to be driven by a current through the second transistor of the current mirror circuit and to switch on or off an indicator light source, wherein the current source comprises two transistors cascode-connected.

In the above embodiment (1) of the invention, the following modifications and changes can be made.

(i) One of the two cascode-connected transistors of the current source is turned off when the indicator light source is turned off.

(ii) The two cascode-connected transistors include a unipolar transistor.

(iii) The unipolar transistor includes a PMOS transistor.

(iv) The two cascode-connected transistors include a bipolar transistor.

(v) The indicator light source comprises a light-emitting diode (LED).

Points of the Invention

According to one embodiment of the invention, an indicator drive circuit is constructed such that a current source to feed a control current into a current mirror circuit is composed of two PMOS transistors that are cascode-connected. Thereby impedance can be increased compared to a conventional circuit that the current source is composed of a single PMOS transistor.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

In the embodiment, with regard to constructional elements having the same function in each of the drawings, the same references will be used, and detail explanation will be omitted.

Configuration of Indicator Drive Circuit

Figure 1:
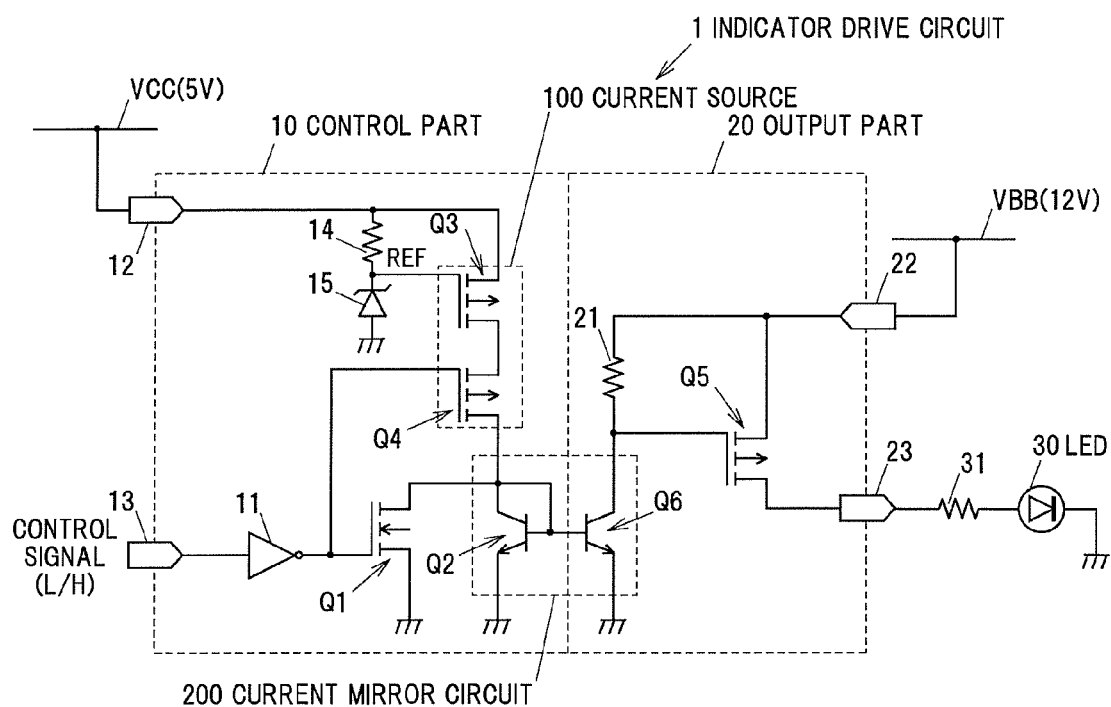
FIG. 1 is a circuit diagram showing an indicator drive circuit according to an embodiment of the invention.

FIG. 1 is a circuit diagram showing an indicator drive circuit according to an embodiment of the invention. The indicator drive circuit 1 includes a control part 10 and an output part 20.

The control part 10 includes an inverter 11 connected to a control input terminal 13, that operates with, for example, a power supply VCC of 5V, an NMOS transistor Q1 that is driven by the inverter 11, an npn transistor Q2 that is one bipolar transistor constituting a current mirror circuit 200, and PMOS transistors Q3, Q4 that supplies a control current to the npn transistor Q2 as a current source 100.

The inverter 11 to which the power supply VCC of 5V is connected via a wiring (not shown) inverts a control signal (L/H) input via the control input terminal 13 so as to output to the NMOS transistor Q1.

To a gate of the NMOS transistor Q1 that is source-grounded, an output of the inverter 11 is connected. A drain of the NMOS transistor Q1 is connected to a collector of the npn transistor Q2 that is emitter-grounded. Namely, the control current that the current source 100 allows to flow into the current mirror circuit 200 is switched via the NMOS transistor Q1 that is switched on or off by the control signal.

The current source 100 that allows the control current to flow into the current mirror circuit 200 has a configuration that two PMOS transistors Q3, Q4 are cascode-connected.

Namely, the current source 100 including two PMOS transistors Q3, Q4 has a configuration that a drain of the PMOS transistor Q3 and a source of the PMOS transistor Q4 are connected so that the PMOS transistors Q3, Q4 are arranged in series, and the power supply VCC is connected to a source of the PMOS transistor Q3 via a power supply terminal 12. In addition, a drain of the PMOS transistor Q4 is connected to a drain of the NMOS transistor Q1 and a collector of the npn transistor Q2.

A predetermined reference voltage REF is applied to a gate of the PMOS transistor Q3. The reference voltage REF is configured to have such electrical potential that the PMOS transistor Q3 is switched always on, and is generated, for example, based on a zener voltage of a constant voltage circuit including a resistor 14 connected between the power supply VCC and a GND in series, and a zener diode 15.

An output of the inverter 11 is divergingly connected to a gate of the PMOS transistor Q4 that is another PMOS transistor of the current source 100.

Figure 2:
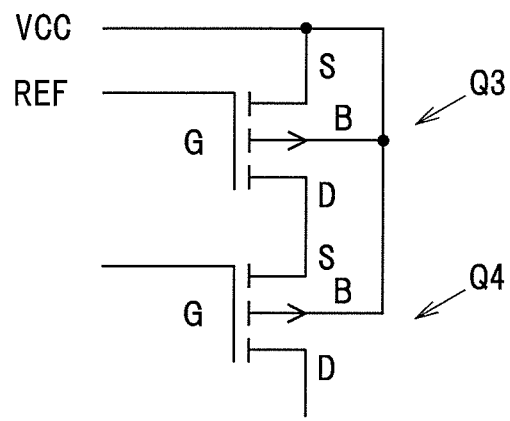
FIG. 2 is a circuit diagram showing a current source shown in FIG. 1 in detail, in which two PMOS transistors are cascode-connected.

Here, FIG. 2 is a circuit diagram showing the current source 100 shown in FIG. 1 in detail, in which two PMOS transistors Q3, Q4 are cascode-connected. As shown in FIG. 2, the power supply VCC is connected to back gates B of both PMOS transistors Q3, Q4. Due to this, the electrical potential just below a channel of the PMOS is fixed to a high potential of 5V.

Further, the current source 100 can have a configuration that, for example, two pnp bipolar transistors are cascode-connected.

Short circuit is caused between a base and a collector of the npn transistor Q2, and the base is connected to a base of an npn transistor Q6 of an output part 20 explained next. Both of the two npn transistors Q2, Q6 are emitter-grounded, thereby the current mirror circuit 200 is configured, in which electrical currents flowing along the transistors Q2, Q6 coordinate with each other. Further, if current amplification factors of the npn transistors Q2, Q6 are equal to each other, it results in that the same amount of electrical current as that supplied from the two PMOS transistors Q3, Q4 flows into the npn transistor Q6.

Further, here, of the two npn transistors Q2, Q6 constituting the current mirror circuit 200, the npn transistor Q2 located at a side of the control part 10 is referred to as a transistor at a control side, and the npn transistor Q6 located at a side of the output part 20 is referred to as a transistor at a controlled side.

The output part 20 has a configuration that a battery power supply VBB of vehicles (for example, 12V) is connected thereto via a power supply terminal 22, and an LED 30 that is a light source of the indicator and a resistor 31 that limits electrical current flowing along the LED 30 are connected to an output terminal 23. In addition, the output part 20 includes a PMOS transistor Q5 that is a switching element allowing the LED 30 to be switched on or off and the above-mentioned npn transistor Q6 at the controlled side constituting the current mirror circuit 200.

The battery power supply VBB is connected to a source of the PMOS transistor Q5 that is a switching element so that a drive current from the battery of vehicles is supplied thereto. In addition, a resistor 21 between a gate and a source of the PMOS transistor Q5 is pulled-up in the power supply line of the battery power supply VBB. A gate of the PMOS transistor Q5 is connected to a collector of the npn transistor Q6 at a controlled side of the current mirror circuit 200.

Operation of the Indicator Drive Circuit

When the control signal applied to the control input terminal 13 is a low level L (turn-off control), a signal of a high level H inverted by the inverter 11 is applied to a gate of the PMOS transistor Q4 constituting the current source 100, the PMOS transistor Q4 is switched off. Due to this, the control current that the PMOS transistor Q3 allows to flow into the npn transistor Q2 at a control side of the current mirror circuit 200 is blocked. Consequently, the current does not flow into the npn transistor Q6 at a controlled side of the current mirror circuit 200.

In addition, likewise, when the control signal is the low level L, the NMOS transistor Q1 is switched on by a gate voltage of the high level H inverted by the inverter 11. At this time, base currents of the two npn transistors Q2, Q6 constituting the current mirror circuit 200 flow into the GND via the NMOS transistor Q1, thus both of the npn transistors Q2, Q6 are switched off.

As mentioned above, by the control signal of the low level L, the npn transistor Q2 at a control side of the current mirror circuit 200 is switched off, and at the same time the control current from the current source 100 is also blocked. Consequently, an electrical current does not flow into the npn transistor Q6 at a controlled side of the current mirror circuit 200 and the resistor 21, thereby the PMOS transistor Q5 is switched off so as to switch off the LED 30.

Further, in the embodiment, the PMOS transistor Q4 that is one of PMOS transistors cascode-connected is switched off by the signal of the high level H obtained by inverting the control signal of the low level L at the time of the light-out control, thus even if a noise current is induced in the control part 10 by, for example, an influence of Electromagnetic Interface (EMI) or the like, the current mirror circuit 200 is not affected. Consequently, it can be prevented that the LED 30 erroneously lights up at the time of the light-out control by the influence of EMI or the like.

On the other hand, when the control signal applied to the control input terminal 13 is a high level H (turn-on control), a signal of a low level L inverted by the inverter 11 is applied to the gate of the PMOS transistor Q4, and the PMOS transistor Q4 is switched on. At the same time, the NMOS transistor Q1 is switched off by a gate voltage of a low level L that the inverter 11 outputs.

At this time, a predetermined control current is supplied to the npn transistor Q2 at a control side of the current mirror circuit 200 via the two PMOS transistors Q3, Q4 that are cascode-connected. Consequently, the same amount of electrical current flows also into the npn transistor Q6 at a controlled side, and an on-voltage is generated in the resistance 21 between the gate and source of the PMOS transistor Q5. The PMOS transistor Q5 that is a switching element is switched on, thereby a current-carrying circuit is formed between the battery power supply VBB and the LED 30 so as to switch off the LED 30.

Effects of the Embodiment

According to the above-mentioned indicator drive circuit 1, the current source 100 that allows the control current to flow into the current mirror circuit 200 is configured by the two PMOS transistors Q3, Q4 that are cascode-connected, thereby impedance can be increased in comparison with a conventional circuit in which, for example, the current source is configured by a single PMOS transistor Q3.

Figure 3:
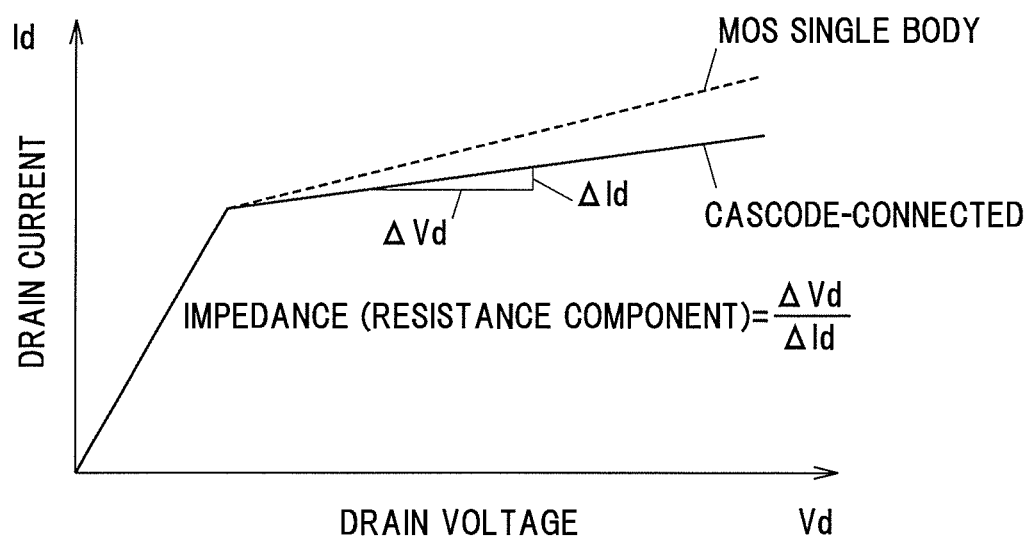
FIG. 3 is a graph showing DC characteristics when MOS transistors are cascode-connected.

Here, FIG. 3 is a graph showing DC characteristics (relationship between a drain voltage Vd and a drain current Id) in the case that the two MOS transistors are cascode-connected. Further, in FIG. 3, for comparison, the DC characteristics in case of a single MOS transistor are shown by a dashed line. As shown in FIG. 3, it is understood that the MOS transistors cascode-connected has larger impedance (resistance component $\Delta Vd/\Delta Id$ in FIG. 3) in a saturated region than the single MOS transistor.

Thus, even if a voltage of the power supply VCC shifts in the form of DC, by the large resistance component of the two PMOS transistors Q3, Q4 cascode-connected, an amount of variation of the control current supplied to the npn transistor Q2 at a control side can be reduced in comparison with the conventional case. In addition, even if an AC noise is generated in the power supply VCC, by the large inductance component of the two PMOS transistors Q3, Q4 cascode-connected, variation of the current supplied to the npn transistor Q2 at a control side can be reduced in comparison with the conventional case.

Consequently, an influence of voltage variation of the power supply VCC on the current that flows along the current mirror circuit 200 can be reduced, and it can be prevented that the LED 30 that is a light source of an indicator fluctuates or flickers in brightness by variation of the power supply VCC.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An indicator drive circuit, comprising:
    a current mirror circuit comprising a first transistor located at a control side and a second transistor located at a controlled side, a current through the current mirror circuit being switched by an external control signal;
    a current source adapted to feed a control current to the first transistor of the current mirror circuit; and
    a switching element adapted to be driven by a current through the second transistor of the current mirror circuit and to switch on or off an indicator light source;
    an inverter that inverts the external control signal, wherein the current source comprises two cascode-connected transistors, and one of the two transistors is controlled by the control signal inverted by the inverter.

2. The indicator drive circuit according to claim 1, wherein one of the two cascode-connected transistors of the current source is turned off when the indicator light source is turned off.

3. The indicator drive circuit according to claim 1, wherein the two cascode-connected transistors include an unipolar transistor.

4. The indicator drive circuit according to claim 3, wherein the unipolar transistor includes a PMOS transistor.

5. The indicator drive circuit according to claim 1, wherein the two cascode-connected transistors include a bipolar transistor.

6. The indicator drive circuit according to claim 1, wherein the indicator light source comprises a light-emitting diode (LED).

* * * * *